(12) United States Patent
Dixon (10) Patent No.: US 9,976,342 B1
(45) Date of Patent: May 22, 2018

(54) SCRATCH PREVENTION DEVICE (71) Applicant: Kevin M. Dixon, Charlotte, NC (US)

(72) Inventor: Kevin M. Dixon, Charlotte, NC (US)

(*) Notice: Subject to any disclaimer, the term of this patent is extended or adjusted under 35 U.S.C. 154(b) by 0 days. days.

(21) Appl. No.: 15/447,782

(22) Filed: Mar. 2, 2017

(51) Int. Cl.
| E06B 7/28 | (2006.01) |
| E06B 3/70 | (2006.01) |
| A01K 15/02 | (2006.01) |
| A01K 1/035 | (2006.01) |

(52) U.S. Cl.
CPC ............... *E06B 7/28* (2013.01); *A01K 1/035* (2013.01); *A01K 15/024* (2013.01); *E06B 3/7001* (2013.01)

(58) Field of Classification Search
CPC ................................ E06B 7/28; E06B 3/7001
USPC .......................................................... 49/460
See application file for complete search history.

(56) References Cited

U.S. PATENT DOCUMENTS

| 1,810,510 | A | * | 6/1931 | Winne | ................... | E05B 15/02 |
| | | | | | | 16/402 |
| 3,916,838 | A | * | 11/1975 | Swart | ................... | A01K 15/024 |
| | | | | | | 119/712 |
| 5,038,703 | A | * | 8/1991 | Frush | ................... | G10K 1/071 |
| | | | | | | 116/148 |
| 5,103,593 | A | * | 4/1992 | McNaughton | ........... | E04G 21/30 |
| | | | | | | 49/460 |
| 5,379,552 | A | * | 1/1995 | Smith | ................... | A01K 1/035 |
| | | | | | | 16/402 |
| 6,131,354 | A | * | 10/2000 | Thompson | ............ | E05C 19/006 |
| | | | | | | 248/208 |
| 9,447,630 | B1 | * | 9/2016 | Nguyen | ................... | E06B 7/28 |
| 9,648,852 | B2 | * | 5/2017 | Greiner | ................... | A01K 15/02 |
| 2007/0017158 | A1 | * | 1/2007 | Larkin | ................... | E06B 7/28 |
| | | | | | | 49/460 |
| 2008/0086952 | A1 | * | 4/2008 | Holwick | ................... | E06B 7/28 |
| | | | | | | 52/3 |
| 2016/0297165 | A1 | * | 10/2016 | Bogart | ................... | B32B 3/06 |

* cited by examiner

*Primary Examiner* — Gregory J Strimbu

(57) ABSTRACT

A scratch prevention device for a door and a door frame comprising a primary panel and a knob opening located near the top of the primary panel, the knob opening comprising a primary aperture with an outer perimeter, a slot extending away from the outer perimeter of the primary aperture, an edge which runs along the outer perimeter of both the primary aperture and the slot and a seat located on a topmost portion of the edge of the knob opening, wherein the slot, in combination with the primary aperture, permit a door knob to be inserted through the knob opening, and placing the seat on the door knob to secure the scratch prevention device to the knob and wherein the primary panel covers a substantial portion of the door and extends laterally to cover a substantial portion of the door frame located on the knob side of the door.

6 Claims, 12 Drawing Sheets

FIG. 13E    FIG. 13F

SCRATCH PREVENTION DEVICE

FIELD OF THE INVENTION

This invention relates generally to the field of pet accessories and more specifically to the protection of doors, door frames and walls from damage caused by pets.

BACKGROUND OF THE INVENTION

A dog, cat or other pet will often alert its owner by scratching at the door when they want to go outside when nature calls. This event will happen numerous times per day, each and every day. If a pet owner has an actual or invisible fence, their pet may also scratch at the door to alert them that they would like to return inside. Pets may also scratch at interior doors to alert their owner of something, is simply out of anxiety. Owners of pets who scratch to alert are all too familiar with the distinctive markings left on doors, walls and door frames from their pet's behavior. Replacing a door, door frame or repairing a wall is both expensive and time consuming. Additionally, doors and door frames that splinter can cause serious injury and irritation to a pet's legs and feet. Hence, there exists an unsatisfied need for a portable scratch prevention device which protects a door, a door frame and the pets themselves.

SUMMARY OF THE INVENTION

A scratch prevention device for a door and a door frame comprising a primary panel with a top, a bottom, a front and a back, and a knob opening located near the top of the primary panel, the knob opening comprising a primary aperture, a slot extending away from the primary aperture, an edge which runs along a perimeter of the primary aperture and the slot and a seat located on the topmost portion of the edge, wherein the slot, in combination with the primary aperture, permit a door knob to be inserted through the knob opening, and placing the seat on the door knob to secure the scratch prevention device to the knob and wherein the primary panel covers a substantial portion of the door and extends laterally to cover a substantial portion of the door frame located on the knob side of the door.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 4B is a side view of an embodiment of a scratch prevention device according to the instant invention.

DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

2. door
3. door frame
4. knob
5. dead bolt
10. scratch prevention device
11. primary panel
12. front
14. back
15. edge/perimeter
16. top
18. bottom
20. side
25. knob opening
26. slot
27. primary aperture
28. seat
29. edge
30. secondary aperture
32. latch opening Referring to the figures, where like numerals refer to like elements, there is shown in FIGS. 1-7 numerous embodiments of the instant invention. Looking first to FIGS. 1A, 1B and 1C, there is illustrated one embodiment of a scratch prevention device 110 for a door 2 and a door frame 3 comprising a primary panel 111 with a top 116, a bottom 118, a front 112 and a back 114 and a knob opening 125 located near the top of the primary panel, the knob opening comprising a primary aperture 127, a slot 126 extending away from the primary aperture 127, an edge 129 which runs along a perimeter of the primary aperture 127 and the slot 126 and a seat 128 located on the topmost portion of the edge 129 of the primary aperture, wherein the slot 126, in combination with the primary aperture 127, permit a door knob 4 to be inserted through the knob opening 125, and placing the seat 128 on the door knob 4 to secure the scratch prevention device 110 to the knob and wherein the primary panel 111 covers a substantial portion of the door 2 and extends laterally to cover a substantial portion of the door frame 3 located on the knob side of the door.

The term door 2 is known in the art and refers to any interior or exterior door including, but not limited to, metal doors, composite doors, glass doors, fiberglass doors, solid doors, hollow-core doors, wood doors, hinged doors, sliding doors, pocket doors, or any combination thereof. The term door frame 3 is known in the art and refers to the frame of a doorway generally including a pair of jambs and a header. Door frames 3 can be constructed of any material known in the art. The term door knob 4 is known in the art and generally refers to the handle or knob by which a door is opened or closed. The term deadbolt 5 is known in the art and refers to an additional locking mechanism located either above or below a door knob 4.

Looking more closely to the scratch prevention device, one can see illustrated in the figures that the device includes a primary panel with a top, a bottom, a front and a back and a knob opening located near the top of the primary panel. The device also includes a pair of sides and an edge/perimeter which runs along the entire perimeter of the device. The scratch prevention device is made from a plastic material. Any flexible plastic material is adequate. The plastic material must also be rigid enough to protect the door, door frame and wall. In one embodiment, the plastic material is selected from the group including, but not limited to, polyethylene, polypropylene, polybutylene, polyethylene terephthalate, polycarbonate, poly vinyl chloride, and combinations thereof. The scratch prevention device can be opaque, clear, frosted, semi-opaque, or a combination thereof. The scratch prevention device can be any dimension so long as it will hang from a doorknob. The scratch prevention device can have a width of 30, 35, 40, 45, 50, 55, 60, 65, 70, 75, 80, 85, 90, 95, 100, 105, 110, 115, 120, 125, 130, 135, or 140 cm. The scratch prevention device can have a length of 30, 35, 40, 45, 50, 55, 60, 65, 70, 75, 80, 85, 90, 95, 100, 105, 110, 115, 120, 125, 130, 135, 140, 145, 150, 155, 160, 165, 170, 175 or 180 cm.

In one embodiment of the instant invention, the front of the primary panel has a textured surface and the back of the panel has a smooth surface. This embodiment feature gives the pet owner the option to choose which front to display; the smooth surface to mute scratching sound caused by pets or the textured surface to amplify scratching sounds caused by pets. The textured surface is selected from the group including, but not limited to, bumpy, matte, abrasive, corrugated, granular, patterned, pitted, pocked, ribbed, ridged, rough, scaled, or a combination thereof. The textured surface makes the scratching much easier to hear for a pet owner alerting the owner that the pet may need to go outside or come back inside. The textured surface also will often startle the pet to minimize their scratching. This auditory feature created by the textured surface is a key feature in discouraging a pet from scratching a door and can be used as a primary training device for pets. Even with the texture feature, the scratch prevention device is easily customizable by trimming with either a utility knife or household scissors to fit any door and door frame.

Each scratch prevention device includes a knob opening in one form or another. The knob opening is generally located in the center of the device, though, through trimming, the knob opening's location can be customized to the user's needs. The knob opening is generally located near the top of the device to allow for some protection above the opening and to allow for substantial protection laterally to and below the opening. Each knob opening includes a primary aperture which is generally round in shape. Other acceptable shapes include oval, angled, curved, or any combination thereof so long as they will accommodate a door knob. The portion of the primary aperture which is nearest the top of the device is where the seat is located. The seat is where the knob opening rests on a door knob. Emanating away from the primary aperture are one or more slots. Slots may emanate out in any direction from the primary aperture including, but not limited to, vertically, horizontally, or any combination thereof. In one embodiment, a slot extends vertically away from the primary aperture. In another embodiment, a slot extends vertically away from the primary aperture and further includes a secondary aperture at an end of the slot which is wider than the slot. In yet another embodiment, a pair of slots extend away from the primary aperture horizontally. In yet another embodiment, a pair of slots extend away from the primary aperture horizontally and further, each slot includes a secondary aperture at an end of the slot which is wider than the slot.

A slot may have no gap in between its two sides, meaning that each of its sides are in contact with one another. A slot may have a gap between its sides of 1, 2, 3, 4, 5, 6, 7, 8, 9, 10 millimeters or any combination thereof. The knob opening also has an edge which runs along the entire perimeter of the knob opening. In one embodiment of the instant invention the edge may be reinforced by an additional layer of material to strengthen the edge and aid in the prevention of damage or tearing while the device is being mounted onto a door knob or while it is in use. A knob opening is spreadable and flexible and capable of accommodating most known door knobs to allow a scratch prevention device to be hangedly and releasably secured to a door knob. Some embodiments of the instant invention also include one or more secondary apertures located at an end of a slot. The secondary apertures aid in the flexibility of the knob opening and also mitigate the potential tearing of the primary panel during installation and during scratching events (times when a pet is scratching the scratch prevention device).

Another key feature of the instant invention is the fact that the design allows for the scratch prevention device 110 to be used without the need for any additional hardware. Additional hardware includes elements such as screws, hook and loop fasteners, adhesives, tapes, nails, hooks, or any other similar device. While this is a key feature, the scratch prevention device further comprise one or more additional fasteners secured to the back of the primary panel which aid in maintaining the scratch prevention device in a desired location, wherein the additional fasteners are secured to the door and/or the door frame. Any of the additional hardware elements listed above may be used.

One embodiment of the instant invention discloses a scratch prevention device for a door and a door frame comprising a primary panel with a top, a bottom, a front and a back, a knob opening located near the top of the primary panel, the knob opening comprising a primary aperture, a slot extending away from the primary aperture, an edge which runs along a perimeter of the primary exposure and the slot and a seat located on the topmost portion of the edge. The embodiment also includes an extending panel secured to one side of the primary panel and a secondary panel secured to the extending panel wherein the slot, in combination with the primary aperture, permits a door knob to be inserted through the knob opening, and placing the seat on the door knob to secure the scratch prevention device to the knob and wherein the primary panel covers a substantial portion of the door, wherein the extending panel extends angularly away from the door along the door frame and wherein the secondary panel extends laterally to cover a substantial portion of the door frame located on the knob side of the door.

Figures 1A, 1B:
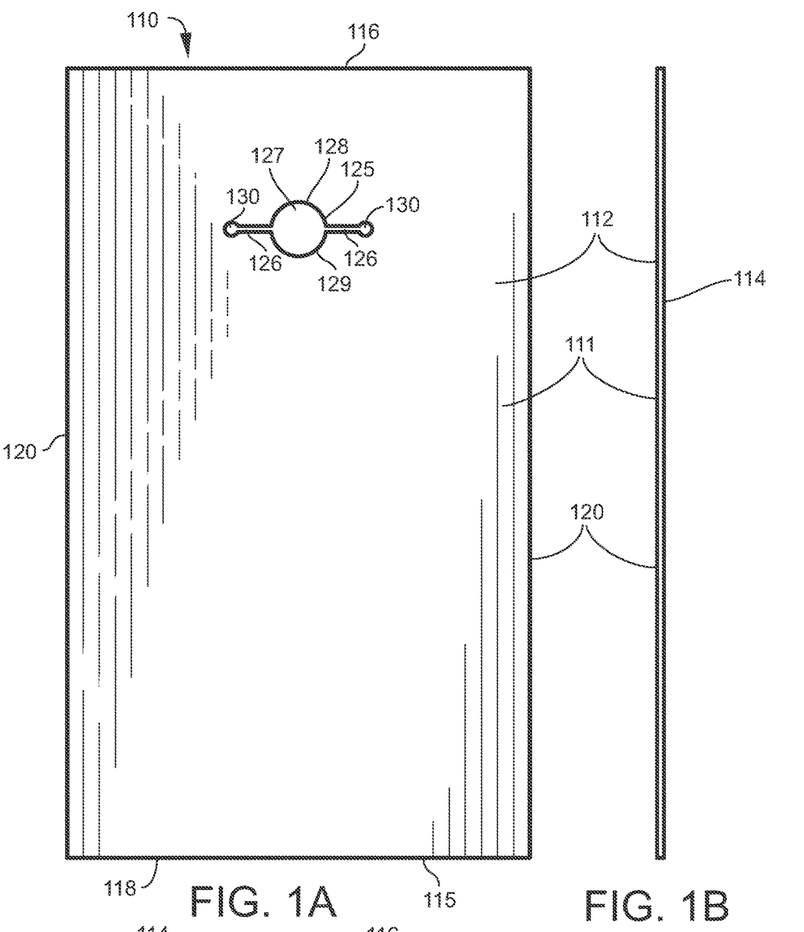
FIG. 1A is a front view of an embodiment of a scratch prevention device according to the instant invention.
FIG. 1B is a side view of an embodiment of a scratch prevention device according to the instant invention.
Figure 1C:
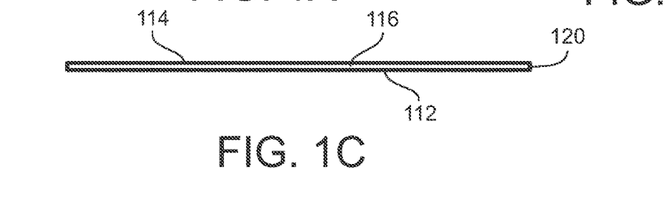
FIG. 1C is a top view of an embodiment of a scratch prevention device according to the instant invention.

Looking more closely at FIGS. 1A. 1B and 1C, there is illustrated one embodiment of scratch prevention device 110. The scratch prevention device 110 includes a primary panel 111 with a front 112, a back 114, a top 116, a bottom 118, a pair of sides 120, and an edge 115 which runs along the entire perimeter of the primary panel 111. As shown in FIG. 1A, this embodiment has a knob opening 125 which includes a primary aperture 127 and a pair of slots 126 emanating laterally and horizontally from the perimeter of the primary aperture 127. At the end of each slot 126 there is a secondary aperture 130 which is wider than the slot. The knob opening 125 also is defined by an edge 129 which runs along the entire perimeter of the knob opening. The portion of the primary aperture 127 which is nearest to the top 116 of the primary panel 111 is the seat 128. It is the seat 128 which rests on a doorknob after the scratch prevention device has been mounted in place.

Figures 2A, 2B:
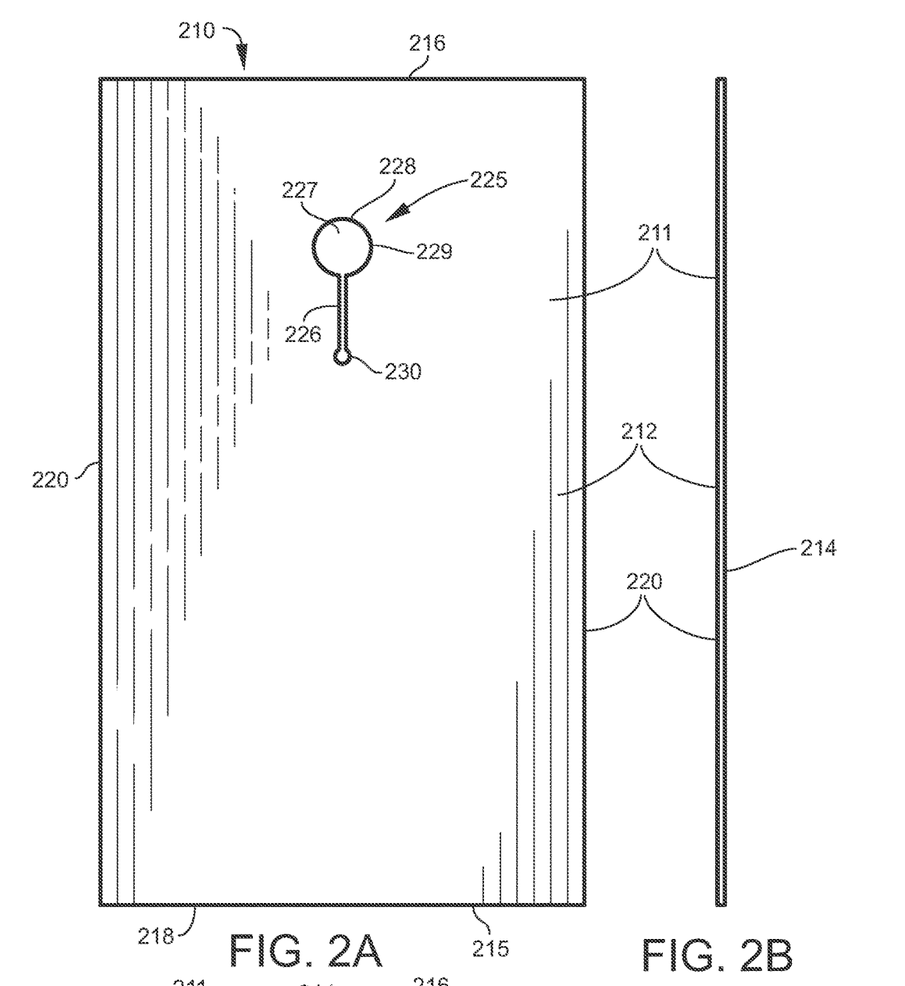
FIG. 2A is a front view of an embodiment of a scratch prevention device according to the instant invention.
FIG. 2B is a side view of an embodiment of a scratch prevention device according to the instant invention.
Figure 2C:
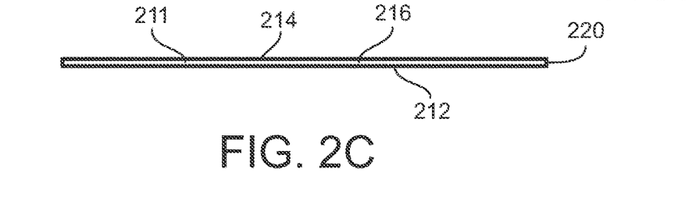
FIG. 2C is a top view of an embodiment of a scratch prevention device according to the instant invention.

Looking more closely at FIGS. 2A. 2B and 2C, there is illustrated another embodiment of scratch prevention device 210. The scratch prevention device 210 includes a primary panel 211 with a front 212, a back 214, a top 216, a bottom 218, a pair of sides 220, and an edge 215 which runs along the entire perimeter of the primary panel 211. As shown in FIG. 2A, this embodiment has a knob opening 225 which includes a primary aperture 227 a single slot 226 emanating vertically downward from the perimeter of the primary aperture 227. At the end of the slot 226 there is a secondary aperture 230 which is wider than the slot. The knob opening 225 also is defined by an edge 229 which runs along the entire perimeter of the knob opening. The portion of the primary aperture 227 which is nearest to the top 216 of the primary panel 211 is the seat 228. It is the seat 228 which rests on a doorknob after the scratch prevention device has been mounted in place. The shape of the knob opening 225 in this embodiment with the slot 226 running vertically downward helps to prevent any damage or tearing of the edge 229.

Figures 3A, 3B, 3C:
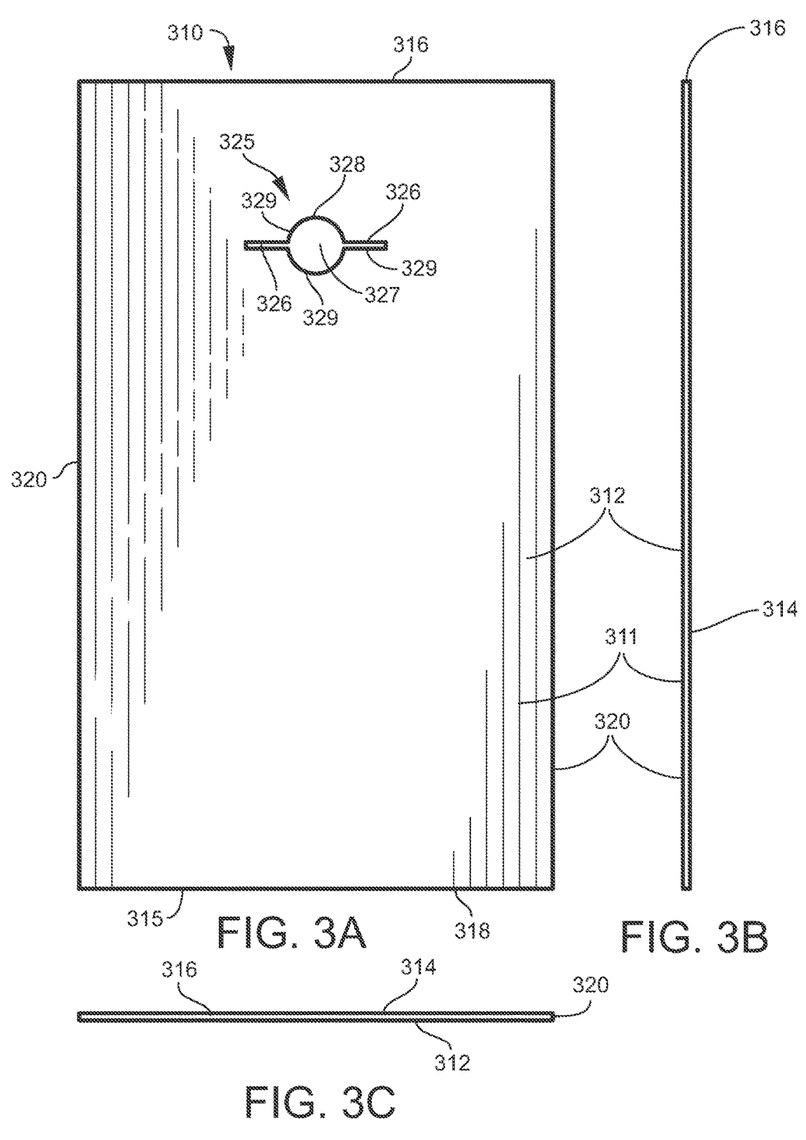
FIG. 3A is a front view of an embodiment of a scratch prevention device according to the instant invention.
FIG. 3B is a side view of an embodiment of a scratch prevention device according to the instant invention.
FIG. 3C is a top view of an embodiment of a scratch prevention device according to the instant invention.

Looking now to FIGS. 3A. 3B and 3C, there is illustrated another embodiment of scratch prevention device 310. The scratch prevention device 310 includes a primary panel 311 with a front 312, a back 314, a top 316, a bottom 318, a pair of sides 320, and an edge 315 which runs along the entire perimeter of the primary panel 311. As shown in FIG. 3A, this embodiment has a knob opening 325 which includes a primary aperture 327 and a pair of slots 326 emanating laterally and horizontally from the perimeter of the primary aperture 327. The knob opening 325 also is defined by an edge 329 which runs along the entire perimeter of the knob opening. The portion of the primary aperture 327 which is nearest to the top 316 of the primary panel 311 is the seat 328. It is the seat 328 which rests on a doorknob after the scratch prevention device has been mounted in place.

Figures 3B, 4A, 4C:
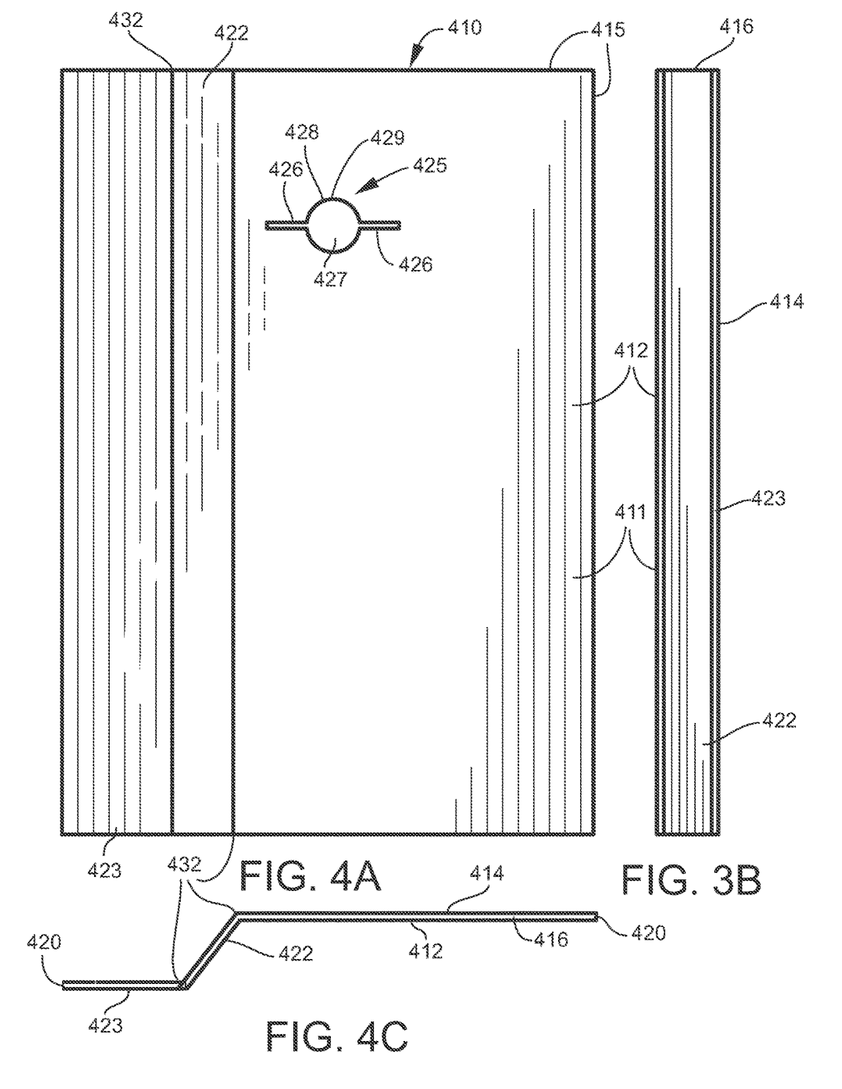
FIG. 4A is a front view of an embodiment of a scratch prevention device according to the instant invention.
FIG. 4C is a top view of an embodiment of a scratch prevention device according to the instant invention.

Looking now to FIGS. 4A. 4B and 4C, there is illustrated another embodiment of scratch prevention device 410. The scratch prevention device 410 includes a primary panel 411 with a front 412, a back 414, a top 416, a bottom 418, a pair of sides 420, and an edge 415 which runs along the entire perimeter of the primary panel 411. This embodiment also includes a pair of fold lines 432 which run from the top 416 to the bottom 418 of the scratch prevention device. The first fold line is located on the side of the primary panel 411 and also defines a first side of an extending panel 422. The extending panel 422 emanates laterally away from and toward the front of the primary panel 411. The second side of the extending panel 422 is defined by the second fold line. In this embodiment, the extending panel 422 is flat. A secondary panel 423 emanates laterally away from the extending panel 422 and runs substantially parallel to the primary panel 411. The secondary panel 423 is defined by the second fold line on one side and the perimeter 415 of the device on the other side. As shown in FIG. 4A, this embodiment has a knob opening 425 which includes a primary aperture 427 and a pair of slots 426 emanating laterally and horizontally from the perimeter of the primary aperture 427. The knob opening 425 also is defined by an edge 429 which runs along the entire perimeter of the knob opening. The portion of the primary aperture 427 which is nearest to the top 416 of the primary panel 411 is the seat 428. It is the seat 428 which rests on a doorknob after the scratch prevention device has been mounted in place. The instant embodiment is designed for use on either an exterior side of a door or on a door with a substantial doorframe (See FIG. 10) to allow the scratch prevention device 410 to lie flatly upon the door surface and upon the frame and wall surface. The instant embodiment can be manufactured so that the extending panel 422 and the secondary panel 423 are on the opposite side of the primary panel 411 so that this embodiment may be used on either left hand opening or right hand opening doors.

Figures 5A, 5B:
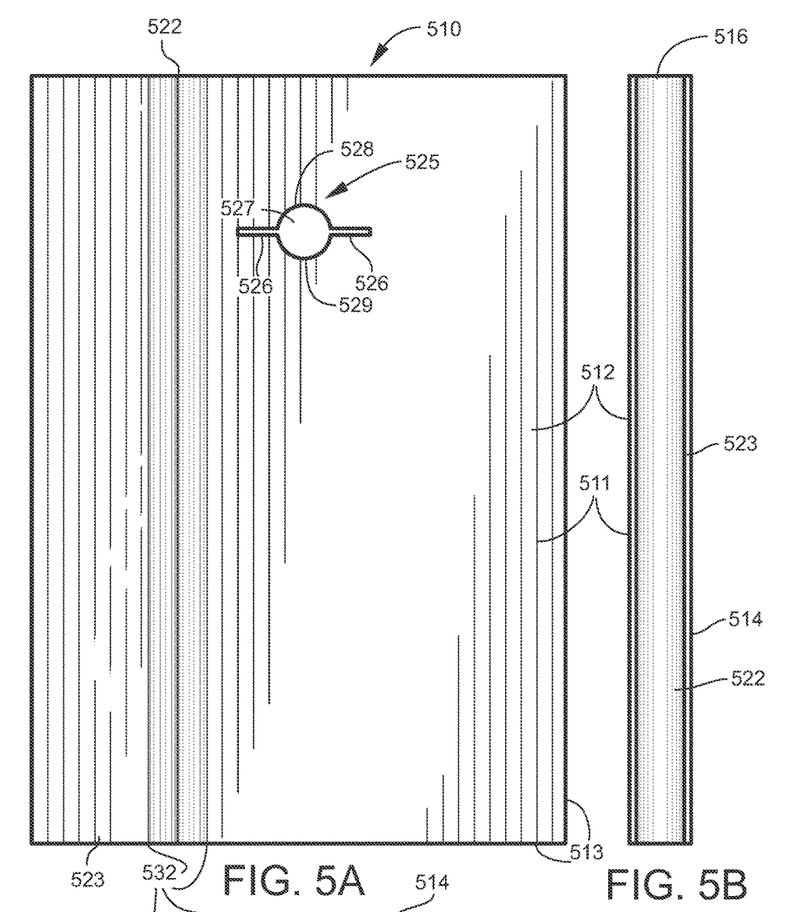
FIG. 5A is a front view of an embodiment of a scratch prevention device according to the instant invention.
FIG. 5B is a side view of an embodiment of a scratch prevention device according to the instant invention.
Figure 5C:
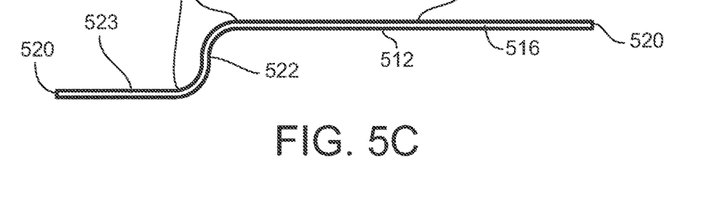
FIG. 5C is a top view of an embodiment of a scratch prevention device according to the instant invention.

Looking now to FIGS. 5A. 5B and 5C, there is illustrated another embodiment of scratch prevention device 510. The scratch prevention device 510 includes a primary panel 511 with a front 512, a back 514, a top 516, a bottom 518, a pair of sides 520, and an edge 515 which runs along the entire perimeter of the primary panel 511. This embodiment also includes a pair of fold lines 532 which run from the top 516 to the bottom 518 of the scratch prevention device. The first fold line is located on the side of the primary panel 511 and also defines a first side of an extending panel 522. The extending panel 522 emanates laterally away from and toward the front of the primary panel 511. The second side of the extending panel 522 is defined by the second fold line. In this embodiment, the extending panel 522 is flexible or curved. A secondary panel 523 emanates laterally away from the extending panel 522 and runs substantially parallel to the primary panel 511. The secondary panel 523 is defined by the second fold line on one side and the perimeter 515 of the device on the other side. As shown in FIG. 5A, this embodiment has a knob opening 525 which includes a primary aperture 527 and a pair of slots 526 emanating laterally and horizontally from the perimeter of the primary aperture 527. The knob opening 525 also is defined by an edge 529 which runs along the entire perimeter of the knob opening. The portion of the primary aperture 527 which is nearest to the top 516 of the primary panel 511 is the seat 528. It is the seat 528 which rests on a doorknob after the scratch prevention device has been mounted in place. The instant embodiment is designed for use on either an exterior side of a door or on a door with a substantial doorframe (See FIG. 10) to allow the scratch prevention device 510 to lie flatly upon the door surface and upon the frame and wall surface. The instant embodiment can be manufactured so that the extending panel 522 and the secondary panel 523 are on the opposite side of the primary panel 511 so that this embodiment may be used on either left hand opening or right hand opening doors.

Figure 6A:
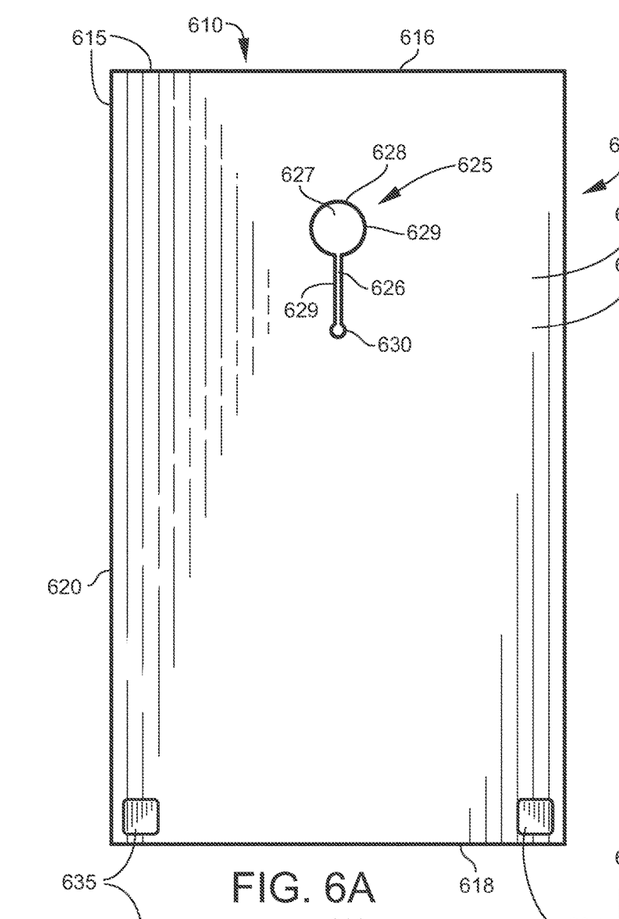
FIG. 6A is a front view of an embodiment of a scratch prevention device according to the instant invention.
Figure 6B:
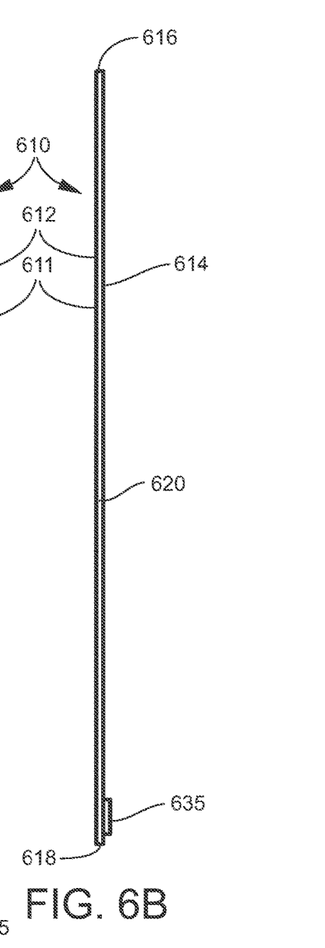
FIG. 6B is a side view of an embodiment of a scratch prevention device according to the instant invention.
Figure 6C:
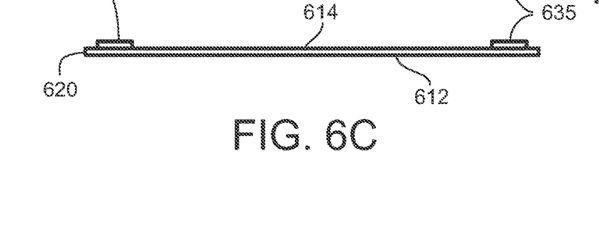
FIG. 6C is a top view of an embodiment of a scratch prevention device according to the instant invention.

Looking more closely at FIGS. 6A, 6B and 6C, there is illustrated another embodiment of scratch prevention device 610. The scratch prevention device 210 includes a primary panel 611 with a front 612, a back 614, a top 616, a bottom 618, a pair of sides 620, and an edge 615 which runs along the entire perimeter of the primary panel 611. As shown in FIG. 6A, this embodiment has a knob opening 625 which includes a primary aperture 627 a single slot 626 emanating vertically downward from the perimeter of the primary aperture 627. At the end of the slot 626 there is a secondary aperture 630 which is wider than the slot. The knob opening 625 also is defined by an edge 629 which runs along the entire perimeter of the knob opening. The portion of the primary aperture 627 which is nearest to the top 616 of the primary panel 611 is the seat 628. It is the seat 628 which rests on a doorknob after the scratch prevention device has been mounted in place. The shape of the knob opening 625 in this embodiment with the slot 626 running vertically downward helps to prevent any damage or tearing of the edge 629. The instant embodiment also includes a pair of fasteners 635 located at the bottom on the backside of the primary panel. The fasteners 635 will keep the scratch prevention device 610 from swinging while mounted on a doorknob and maintain the position of the device.

Figures 7A, 7B, 7C:
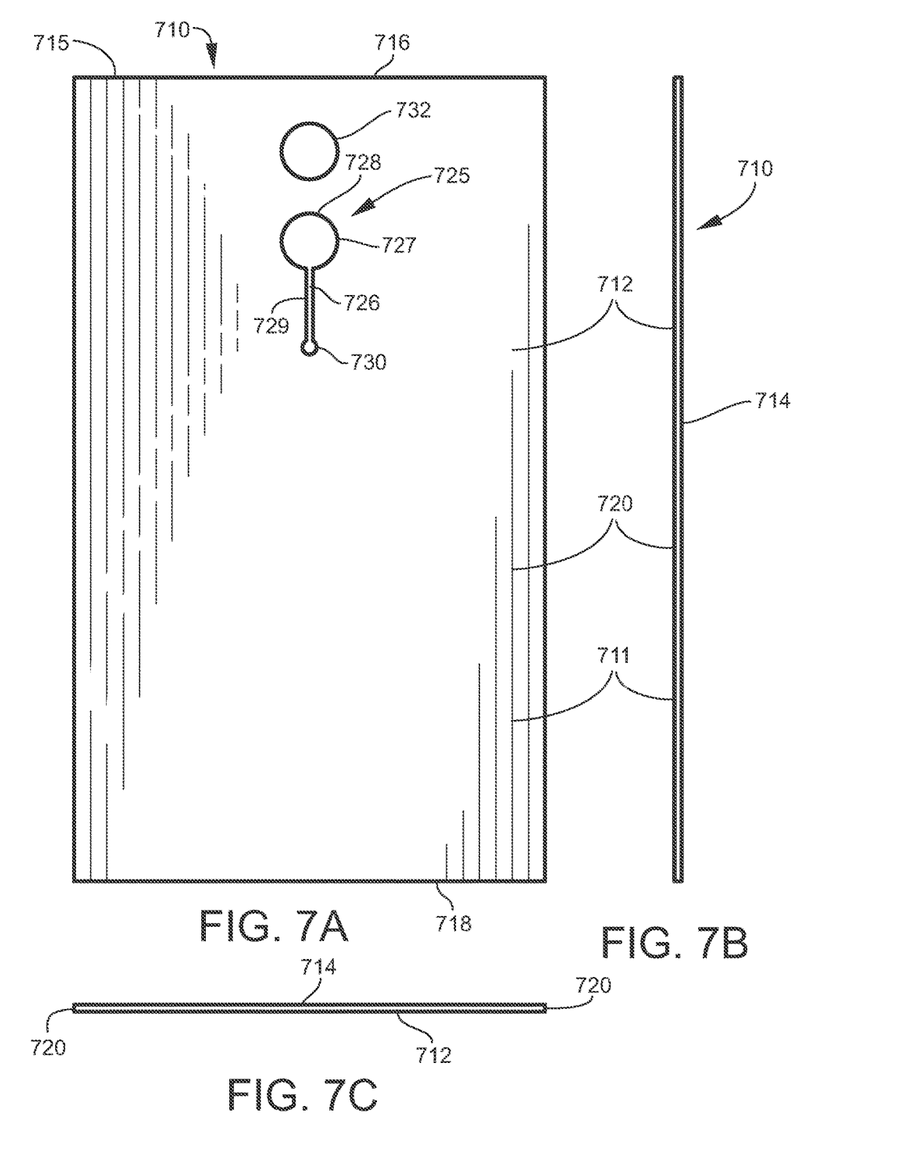
FIG. 7A is a front view of an embodiment of a scratch prevention device according to the instant invention.
FIG. 7B is a side view of an embodiment of a scratch prevention device according to the instant invention.
FIG. 7C is a top view of an embodiment of a scratch prevention device according to the instant invention.

Looking more closely at FIGS. 7A, 7B and 7C, there is illustrated another embodiment of scratch prevention device 710. The scratch prevention device 710 includes a primary panel 711 with a front 712, a back 714, a top 716, a bottom 718, a pair of sides 720, and an edge 715 which runs along the entire perimeter of the primary panel 711. As shown in FIG. 7A, this embodiment has a knob opening 725 which includes a primary aperture 727 a single slot 726 emanating vertically downward from the perimeter of the primary aperture 727. At the end of the slot 726 there is a secondary aperture 730 which is wider than the slot. The knob opening 725 also is defined by an edge 729 which runs along the entire perimeter of the knob opening. The portion of the primary aperture 727 which is nearest to the top 716 of the primary panel 711 is the seat 728. It is the seat 728 which rests on a doorknob after the scratch prevention device has been mounted in place. The shape of the knob opening 725 in this embodiment with the slot 726 running vertically downward helps to prevent any damage or tearing of the edge 729. The instant embodiment further includes a latch opening 732 located above the knob opening 725. The latch opening 732 permits direct and easy access to a deadbolt located above a doorknob. A latch opening may be located anywhere on a primary panel to correspond with a deadbolt location on a door.

Figure 8:
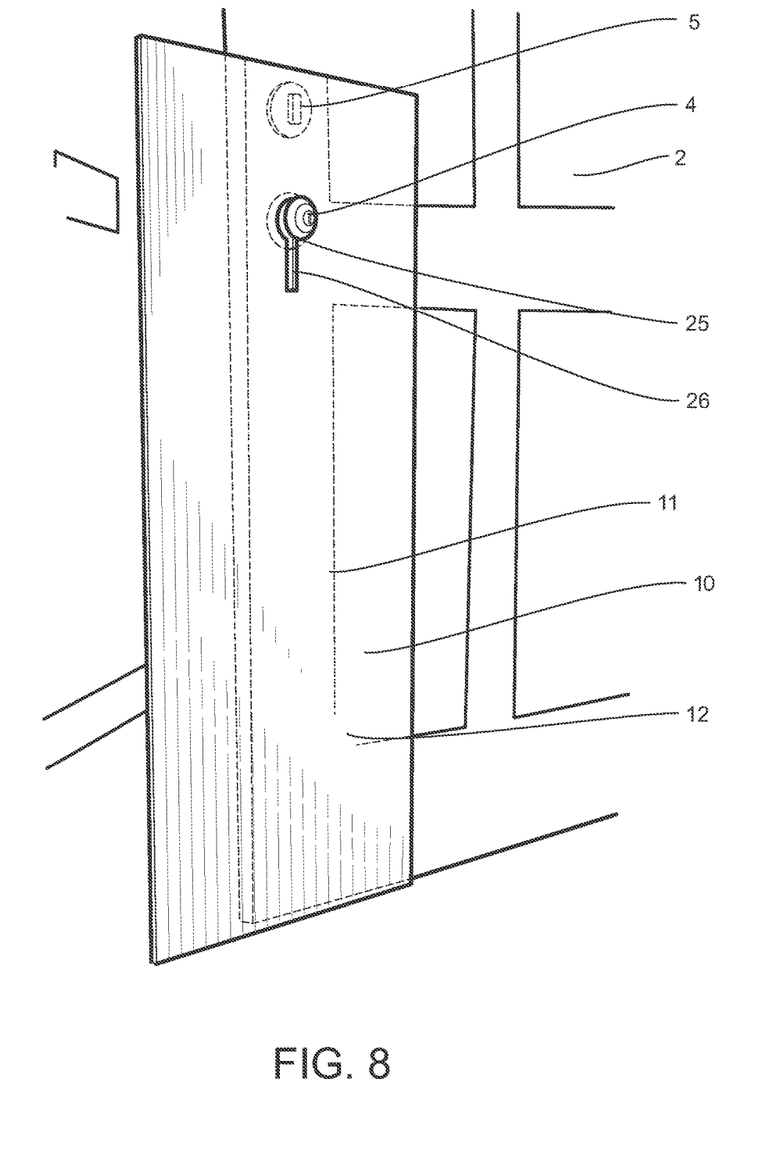
FIG. 8 is a profile view of one embodiment of a scratch prevention device in use.

Looking now to FIGS. 8-12, several illustrations depict a scratch prevention device 10 in use. FIG. 8 illustrates a scratch prevention device 10 with a primary panel 11 having a front 12 which is shown as textured and transparent. The knob opening 25 is shown with the slot 26 extending downward from the primary aperture. The scratch prevention device 10 is mounted on a doorknob 4 and is shown protecting a door 2, the door frame and wall. A deadbolt 5 is clearly visible behind the primary panel 11.

Figure 9:
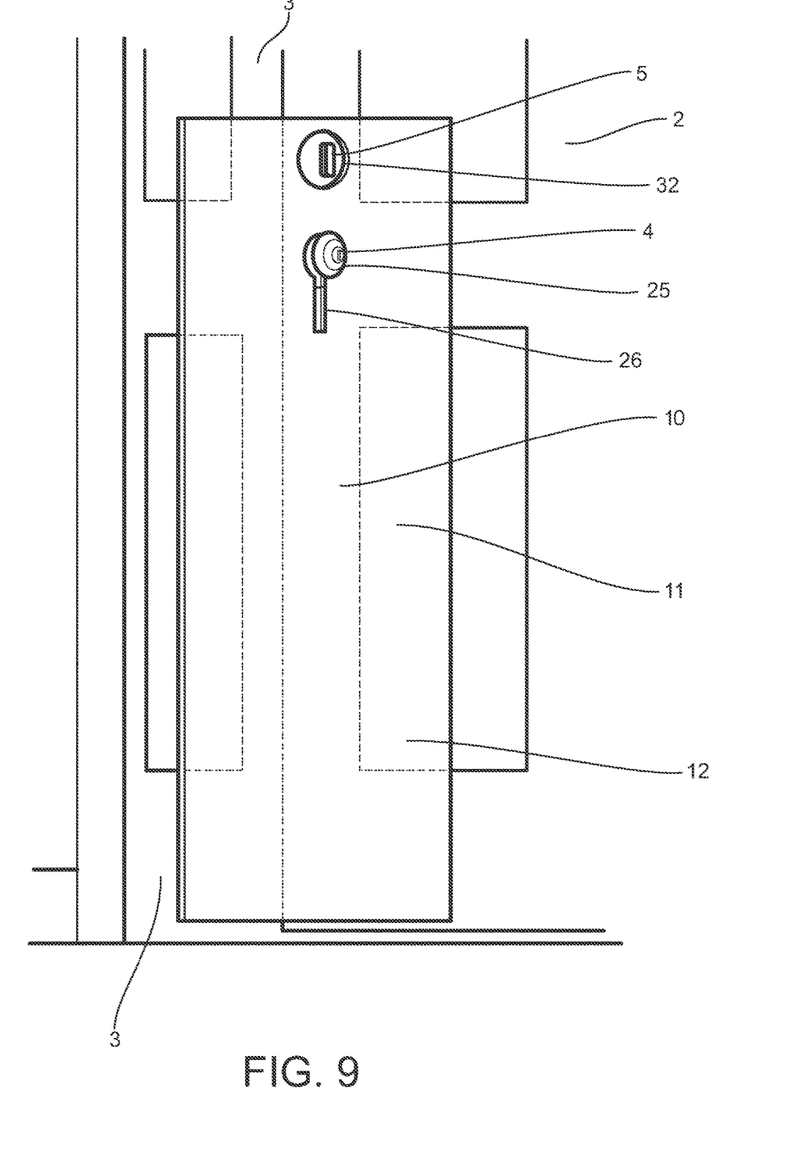
FIG. 9 is a front view of one embodiment of a scratch prevention device in use.

FIG. 9 illustrates a scratch prevention device 10 with a primary panel 11 having a front 12 which is shown as textured and transparent. The knob opening 25 is shown with the slot 26 extending downward from the primary aperture. The scratch prevention device 10 is mounted on a doorknob 4 and is shown protecting a door 2, the door frame 3 and wall. A deadbolt 5 is accessible through the latch opening 32 located above the knob opening 25 on the primary panel 11.

Figure 10:
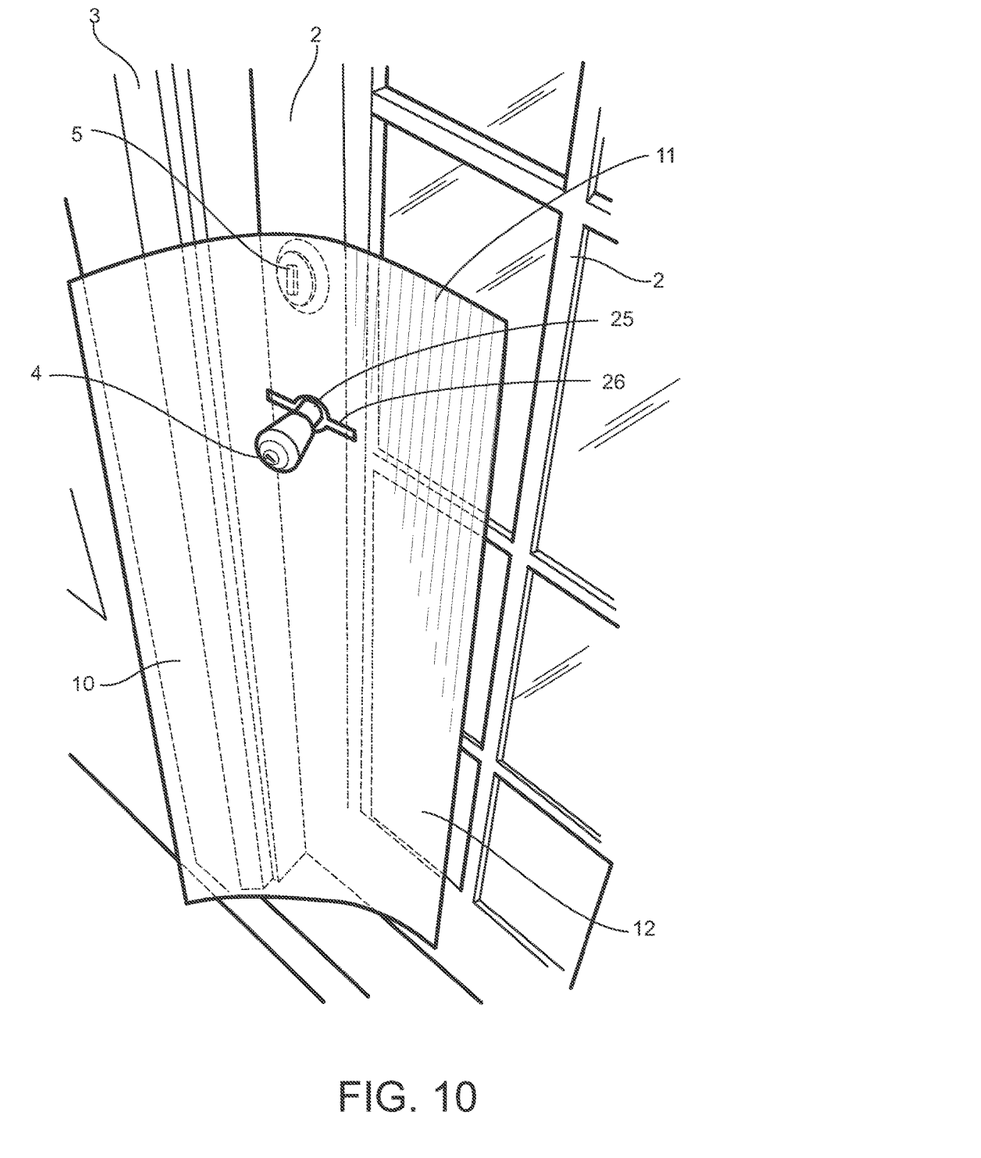
FIG. 10 is a profile view of one embodiment of a scratch prevention device in use.
Figure 11:
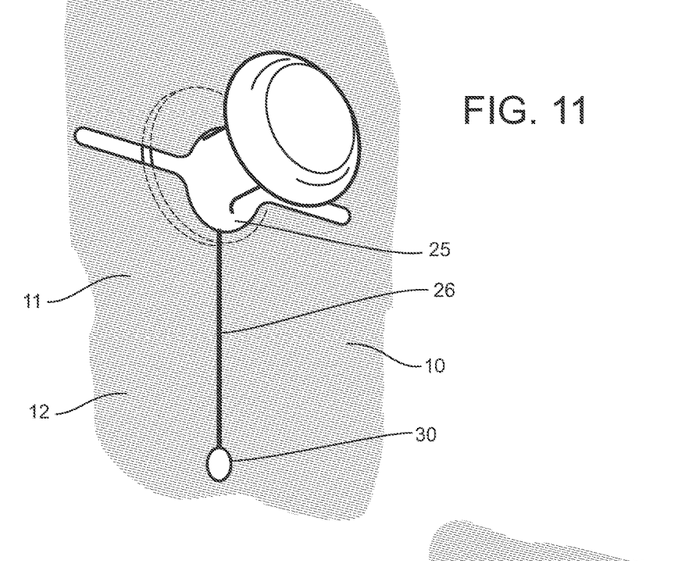
FIG. 11 is a close-up profile view of one embodiment of a scratch prevention device in use.
Figure 12:
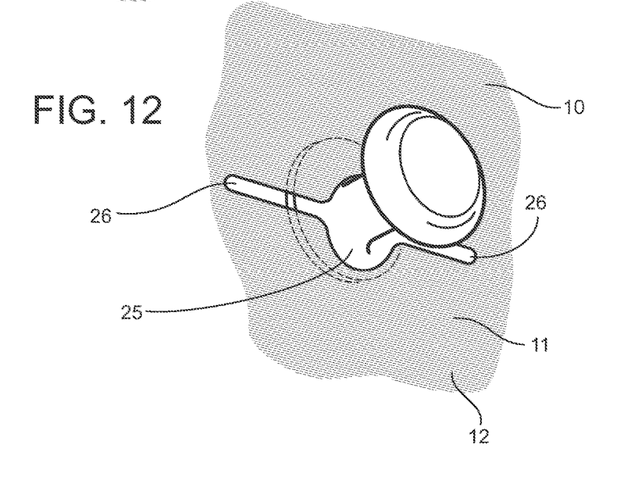
FIG. 12 is a close-up profile view of one embodiment of a scratch prevention device in use
Figure 13A:
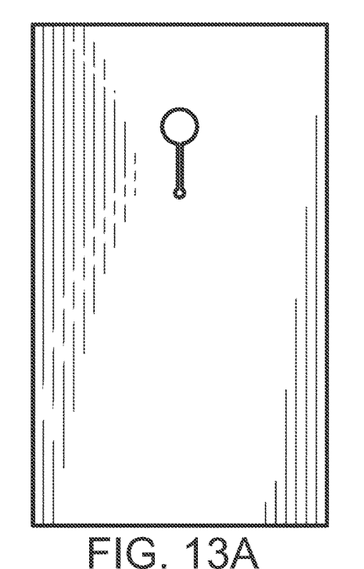
FIG. 13A is a front view of an embodiment of a scratch prevention device according to the instant invention.
Figures 13B, 13C, 13D:
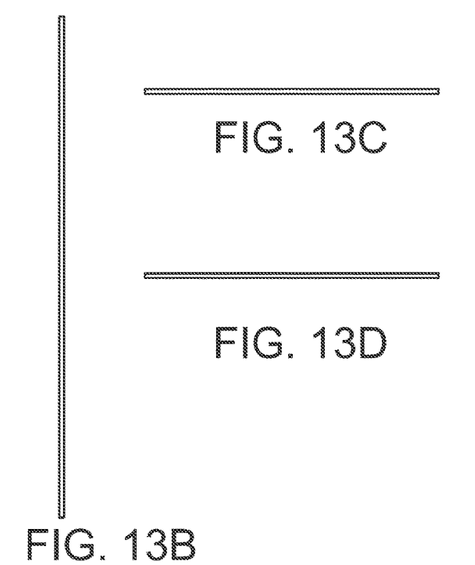
FIG. 13B is a side view of an embodiment of a scratch prevention device according to the instant invention.
FIG. 13C is a top view of an embodiment of a scratch prevention device according to the instant invention.
FIG. 13D is a top view of an embodiment of a scratch prevention device according to the instant invention.
Figure 13E:
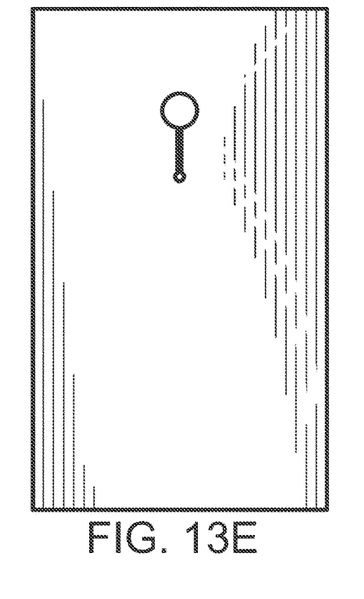
FIG. 13E is a front view of an embodiment of a scratch prevention device according to the instant invention.
Figure 13F:
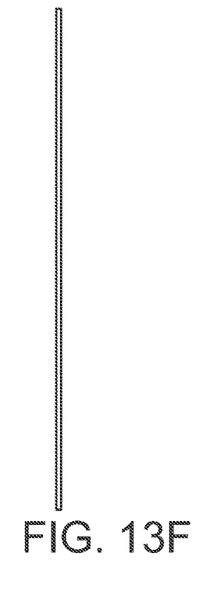
FIG. 13F is a side view of an embodiment of a scratch prevention device according to the instant invention.

FIG. 10 illustrates a scratch prevention device 10 which is mounted on a doorknob 4 on the exterior side of a door 2. A primary panel 11 having a front 12 which is shown as textured and transparent. The knob opening 25 is shown with a pair of slots 26 extending laterally and horizontally from the primary aperture. The scratch prevention device 10 is mounted on a doorknob 4 and is shown protecting a door 2, the door frame 3 and wall by bending to accommodate the extended door frame. A deadbolt 5 is clearly visible behind the primary panel 11. FIGS. 11 and 12 illustrate close-up views of knob openings in different configurations. FIGS. 13A through 13F illustrate one embodiment of a scratch prevention device from each direction.

The instant invention further includes a method of protecting a door and a door frame comprising the steps of:
(a) providing a scratch prevention device for a door and a door frame comprising:
a primary panel with a top, a bottom, a front and a back; and
a knob opening located near the top of the primary panel, the knob opening comprising:
a primary aperture;
a slot extending away from the primary aperture;
an edge which runs along a perimeter of the primary exposure and the slot; and
a seat located on the topmost portion of the edge;
(b) inserting a door knob through the knob opening by spreading the slot and primary aperture wide enough to accommodate the door knob;
(c) placing the seat on the door knob to secure the scratch prevention device to the knob; and
(d) hanging the scratch prevention device from the knob wherein the primary panel covers a substantial portion of the door and extends laterally to cover a substantial portion of the door frame located on the knob side of the door.

In one embodiment of the above method, the front of the primary panel has a textured surface and the back of the panel has a smooth surface. The textured surface is selected from the group including, but not limited to, bumpy, abrasive, corrugated, granular, patterned, pitted, pocked, ribbed, ridged, rough, scaled, or a combination thereof. In one embodiment of the above method, the device is made from a plastic material selected from the group including, but not limited to, polyethylene, polypropylene, polybutylene, polyethylene terephthalate, polycarbonate, poly vinyl chloride, and combinations thereof. In another embodiment of the above method, the slot extends vertically away and downward from the primary aperture and further comprises a secondary aperture at an end of the slot which is wider than the slot. In yet another embodiment of the above method, a pair of slots extend away from the primary aperture horizontally. The above method may further comprise one or more additional fasteners secured to the back of the primary panel which aid in maintaining the scratch prevention device in a desired location, wherein the additional fasteners are secured to the door and/or the door frame.

The instant invention further includes an additional method of protecting a door and a door frame comprising the steps of:
(e) providing a scratch prevention device for a door and a door frame comprising:
a primary panel with a top, a bottom, a front and a back;
a knob opening located near the top of the primary panel, the knob opening comprising:
a primary aperture;
a slot extending away from the primary aperture;
an edge which runs along a perimeter of the primary exposure and the slot; and
a seat located on the topmost portion of the edge;
an extending panel secured to one side of the primary panel; and
a secondary panel secured to the extending panel;
(f) inserting a door knob through the knob opening by spreading the slot and primary aperture wide enough to accommodate the door knob;
(g) placing the seat on the door knob to secure the scratch prevention device to the knob; and
(h) hanging the scratch prevention device from the knob wherein the primary panel covers a substantial portion of the door, wherein the extending panel extends angularly away from the door along the door frame and wherein the secondary panel extends laterally to cover a substantial portion of the door frame located on the knob side of the door.

In one embodiment of the above method, the front of the primary panel has a textured surface and the back of the panel has a smooth surface. The textured surface is selected from the group including, but not limited to, bumpy, matte, abrasive, corrugated, granular, patterned, pitted, pocked, ribbed, ridged, rough, scaled, or a combination thereof. In one embodiment of the above method, the device is made from a plastic material selected from the group including, but not limited to, polyethylene, polypropylene, polybutylene, polyethylene terephthalate, polycarbonate, poly vinyl chloride, and combinations thereof. In another embodiment of the above method, the slot extends vertically away and downward from the primary aperture and further comprises a secondary aperture at an end of the slot which is wider than the slot. In yet another embodiment of the above method, a pair of slots extend away from the primary aperture horizontally. The above method may further comprise one or more additional fasteners secured to the back of the primary panel which aid in maintaining the scratch prevention device in a desired location, wherein the additional fasteners are secured to the door and/or the door frame.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

I claim:

1. A scratch prevention device for a door and a door frame comprising:
a primary panel having a longitudinal top, a longitudinal bottom, a front, a back, and a longitudinal length, the primary panel defining a first plane;
a knob opening located in the primary panel near the top of the primary panel,
the knob opening comprising:
a primary aperture having a perimeter;
at least one slot extending away from the perimeter of the primary aperture and having a length, a width and a perimeter; and
a topmost portion of the perimeter of the primary aperture comprises a seat;

wherein the slot extends away from the perimeter of the primary aperture and further comprises a secondary aperture at an end of the slot, the secondary aperture having a width which is greater than the width of the slot;

an extending panel is secured to one side of the primary panel and extends from the one side of the primary panel, the extending panel defining a second plane and a longitudinal length; and a secondary panel having a longitudinal top, a longitudinal bottom, a front, a back, and a longitudinal length, the secondary panel secured to the extending panel and defining a third plane;

wherein the extending panel connects the secondary panel to the primary panel such that the first and third planes are generally parallel and the second plane intersects the first and third planes;

wherein the lengths of the primary panel, the extending panel and the secondary panel are substantially equal; and wherein the slot and the primary aperture permit a door knob of the door to be inserted through the knob opening such that the seat of the primary aperture rests on the door knob and the longitudinal lengths of the primary, extending and secondary panels extend generally vertically and a portion of the door is covered by the primary panel, the extending panel extends along the door frame, and the secondary panel covers a portion of the door frame when the door is closed.

2. The scratch prevention device of claim 1 wherein the device is made from a plastic material selected from the group consisting of: polyethylene, polypropylene, polybutylene, polyethylene terephthalate, polycarbonate, poly vinyl chloride, and combinations thereof.

3. The scratch prevention device of claim 1 wherein the front of the primary panel has a textured surface and the back of the primary panel has a smooth surface.

4. The scratch prevention device of claim 3 wherein the textured surface is selected from the group consisting of: a bumpy surface, a corrugated surface, a granular surface, a pitted surface, a pocked surface, a ribbed surface, a ridged surface, a scaled surface, or a combination thereof.

5. The scratch prevention device of claim 1 wherein the slot comprises a pair of slots extending away from the perimeter of the primary aperture.

6. A method of protecting a door and a door frame comprising the steps of:

providing the scratch prevention device of claim 1;

inserting the door knob of the door through the knob opening;

hanging the scratch prevention device on the door knob by placing the seat on the door knob such that the primary panel covers the portion of the door, the extending panel covers a portion of the door frame, and the secondary panel covers the portion of the door frame when the door is closed.

* * * * *